US011987691B2

(12) United States Patent
Yane et al.

(10) Patent No.: US 11,987,691 B2
(45) Date of Patent: May 21, 2024

(54) RESIN MOLDED ARTICLE AND MANUFACTURING METHOD THEREOF

(71) Applicant: CANON KABUSHIKI KAISHA, Tokyo (JP)

(72) Inventors: Akira Yane, Tokyo (JP); Kento Tsuda, Yokohama (JP); Daisuke Tanaka, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 186 days.

(21) Appl. No.: 17/533,861

(22) Filed: Nov. 23, 2021

(65) Prior Publication Data

US 2022/0081543 A1    Mar. 17, 2022

Related U.S. Application Data

(63) Continuation of application No. 16/708,272, filed on Dec. 9, 2019, now Pat. No. 11,208,545.

(30) Foreign Application Priority Data

Dec. 17, 2018    (JP) .................................. 2018-235923

(51) Int. Cl.
*C08L 23/08* (2006.01)
*C08K 3/013* (2018.01)
*C08K 3/04* (2006.01)

(52) U.S. Cl.
CPC .............. *C08L 23/08* (2013.01); *C08K 3/013* (2018.01); *C08K 3/04* (2013.01); *C08L 2203/20* (2013.01); *C08L 2203/30* (2013.01)

(58) Field of Classification Search
CPC ....................................................... C08L 23/08
See application file for complete search history.

(56) References Cited

U.S. PATENT DOCUMENTS

2012/0201568 A1    8/2012  Kurachi
2018/0143584 A1*   5/2018  Nosho ................ G03G 21/1871

FOREIGN PATENT DOCUMENTS

| CN | 102532635 A | 7/2012 |
| CN | 102659441 A | 9/2012 |
| CN | 104231411 A | 12/2014 |
| JP | S46-037280 A | 11/1971 |

(Continued)

OTHER PUBLICATIONS

English Machine Translation JP2015-105980 A Obtained Apr. 14, 2021 at http://translationportal.epo.org/emtp/translate/?ACTION=description (Year: 2015).*

(Continued)

*Primary Examiner* — Arrie L Reuther
(74) *Attorney, Agent, or Firm* — CANON U.S.A., INC. IP Division

(57) ABSTRACT

A resin molded article including an ethylene vinyl acetate copolymer resin and carbon black as primary components. After the resin molded article is heated from 25 degrees Celsius to 100 degrees Celsius and then cooled to 25 degrees Celsius, the shrinkage factor of the resin molded article at 25 degrees Celsius cooled after heated to 100 degrees Celsius relative to the resin molded article at 25 degrees Celsius before heated is less than or equal to 2.0%.

15 Claims, 6 Drawing Sheets

(56) References Cited

FOREIGN PATENT DOCUMENTS

| | | |
|---|---|---|
| JP | S54-053158 A | 4/1979 |
| JP | S60-020950 A | 2/1985 |
| JP | H11-348168 A | 12/1999 |
| JP | 2015-087743 A | 5/2015 |
| JP | 2015105980 A | 6/2015 |
| JP | 2017095609 A | 6/2017 |
| KR | 20100090050 A | 8/2010 |

OTHER PUBLICATIONS

Wang, W., "Principles of Polymer Modification", Mar. 2018, China Light Industry Press.

* cited by examiner

↓ DRAWING DIRECTION
←→ SHEET WIDTH DIRECTION

↓ DRAWING DIRECTION

←→ SHEET WIDTH DIRECTION

RESIN MOLDED ARTICLE AND MANUFACTURING METHOD THEREOF

CROSS-REFERENCE TO RELATED APPLICATIONS

This application is a continuation of U.S. application Ser. No. 16/708,272, filed Dec. 9, 2019, which claims the benefit of Japanese Patent Application No. 2018-235923, filed Dec. 17, 2018, each of which is hereby incorporated by reference herein in their entirety.

BACKGROUND OF THE INVENTION

Field of the Invention

The present disclosure relates to a resin molded article and a manufacturing method thereof that are useful for a conductive member of an electronic device.

Description of the Related Art

A resin molded article having high conductivity has been widely used for a conductive member such as a digital single-lens reflex camera, a compact digital camera, a smartphone, or a personal computer as an alternative member to metal. Further, in accordance with a trend that electronic devices become complicated, precise, and downsized, resin molded articles are required to have higher conductivity.

As a resin molded article having conductivity, for example, Japanese Patent Application Laid-Open No. 2015-105980 discloses that a resin sheet containing carbon black in order to have higher conductivity relative to an ethylene vinyl acetate copolymer resin is used as a capacitance detection unit in a laser printer. However, the conventional resin molded article (resin sheet) using an ethylene vinyl acetate copolymer resin containing carbon black has insufficient conductivity.

SUMMARY OF THE INVENTION

A resin molded article for solving the above disadvantage is a resin molded article including an ethylene vinyl acetate copolymer resin and carbon black as primary components in which a shrinkage factor of the resin molded article at 25 degrees Celsius cooled after heated to 100 degrees Celsius relative to the resin molded article at 25 degrees Celsius before heated, when the resin molded article is heated from 25 degrees Celsius to 100 degrees Celsius and then cooled to 25 degrees Celsius is less than or equal to 2.0%.

Further features of the present disclosure will become apparent from the following description of exemplary embodiments with reference to the attached drawings.

DESCRIPTION OF THE EMBODIMENTS

Resin Molded Article

Figure 1:
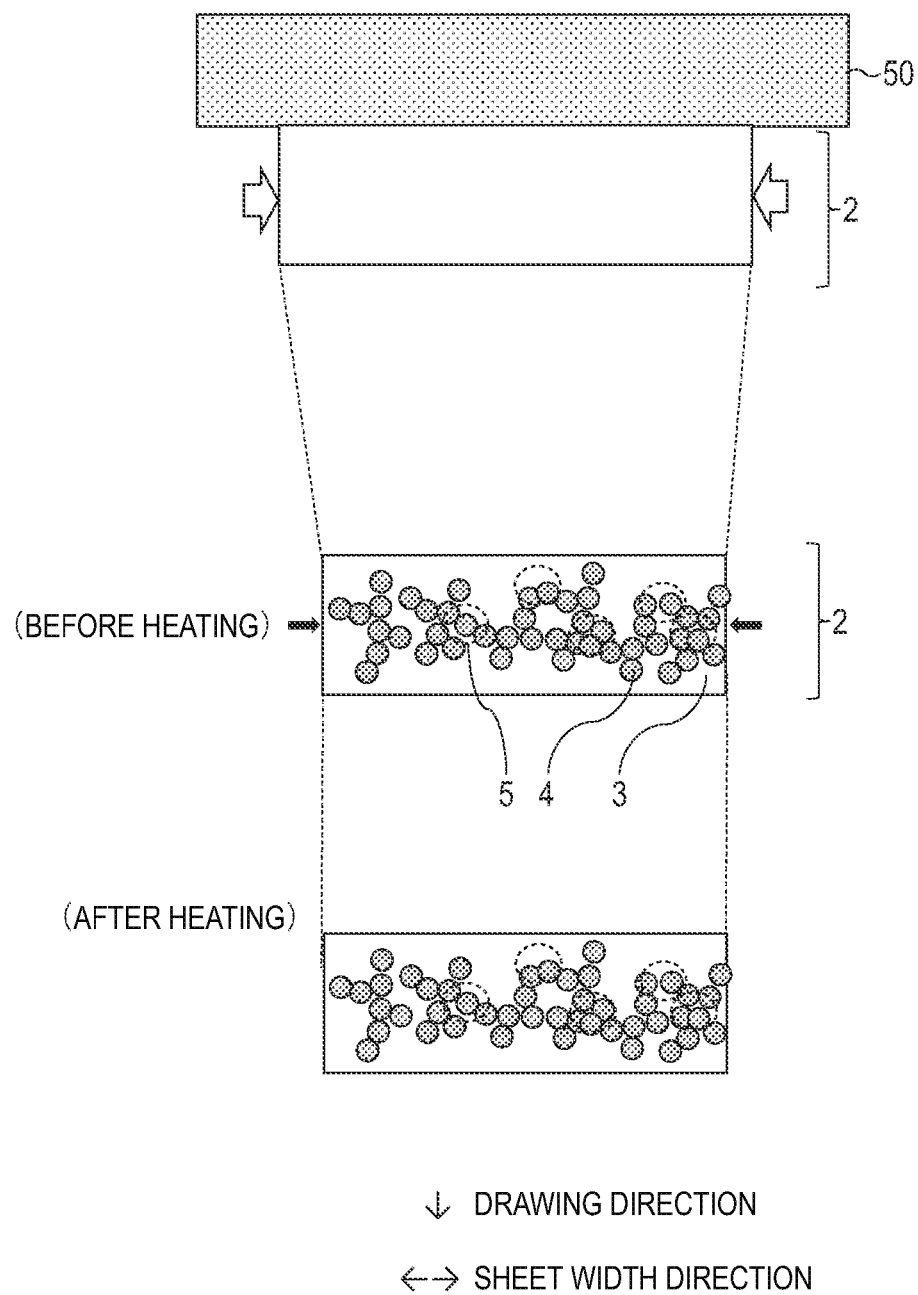
FIG. 1 is a schematic diagram illustrating the structure of a resin molded article of the present disclosure.

A resin molded article of the present disclosure is a resin molded article that is suitable for a sheet shape and exhibits high conductivity even when drawn in a sheet shape.

The resin molded article of the present disclosure includes an ethylene vinyl acetate copolymer resin and carbon black as primary components. In this specification, the primary component means that 80 parts by mass or more of an ethylene vinyl acetate copolymer resin and carbon black, which are the primary components, are contained in 100 parts by mass of the resin molded article. That is, the resin molded article of the present disclosure may contain a component other than an ethylene vinyl acetate copolymer resin and carbon black.

Ethylene Vinyl Acetate Copolymer Resin

The ethylene vinyl acetate copolymer resin contained in the resin molded article of the present disclosure has the structure illustrated in structural formula 1. Since the ethylene vinyl acetate copolymer resin has high adhesiveness, the resin molded article of the present disclosure has high adhesiveness.

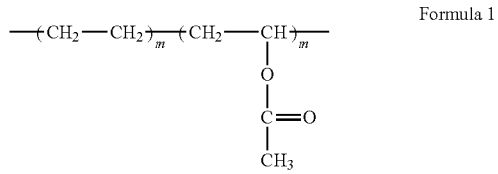

Formula 1

The raw material of the ethylene vinyl acetate copolymer resin used for the resin molded article of the present disclosure is not particularly limited, and a commercial product and a mixture of the commercial products can be used. A commercially available material may be, for example, Ultrathene (Tosoh Corporation), Evaflex® (Du Pont-Mitsui Polychemicals Co., Ltd.), or Suntec™-EVA (Asahi Kasei Chemicals Corporation). Further, a commercially available material may be UBE EVA copolymer (Ube-Maruzen Polyethylene Co., Ltd.), EVATATE (Sumitomo Chemical Company, Limited), Novatec™ EVA (Japan Polyethylene Corporation), SUMITATE (Sumitomo Chemical Company, Limited), or Nipoflex (Tosoh Corporation).

Carbon Black

Carbon black is fine particles of carbon and is classified into furnace black, channel black, acetylene black, Ketjen black, or the like in accordance with the starting raw material thereof or the manufacturing method thereof. The raw material of the carbon black used for the resin molded article of the present disclosure is not particularly limited, and a commercial product and a mixture of the commercial products can be used. A commercially available material may be, for example, MA-7, MA-100, #970, #2200, or #2600 (Mitsubishi Kasei Corporation). Further, special black-5, special black-100, color black S-170, or PRINTEX® 140V (Degussa Japan Co., Ltd.) may be used. Further, a commercially available material may be Neospectramark 1 or Neospectramark 5 (Columbian Carbon Japan, Ltd), SEAST, TOKABLACK, or Thermal black (Tokai Carbon Co., Ltd.).

In the raw material of carbon black, the dibutyl phthalate (DBP) oil absorption is preferably within a range from 100 ml/100 g to 500 ml/100 g. While the viscosity is higher when the ethylene vinyl acetate copolymer resin contains carbon black, the viscosity of the resin composition before molding is a good value when the DBP oil absorption is within the range, which enables easier processing into a sheet. The DBP oil absorption is an index indicating the structure of carbon black, and the larger the amount of DBP absorbed by carbon black is, the larger the numerical value is, which indicates that the structure is developed. Note that DBP is an abbreviation of Di-butyl phthalate that is a sort of plasticizing material. When the DBP oil absorption is less than 100 ml/100 g, a large amount of carbon black has to be contained to ensure sufficient conductivity, and the adhesiveness of the resin molded article may decrease. On the other hand, when a DBP oil absorption is greater than 500 ml/100 g, since the structure of carbon black is excessively large, the viscosity of the resin composition increases due to an increase in the interfere between carbon black particles, which may make processing into a sheet difficult.

The content of carbon black is preferably within a range from 15 parts by mass to 50 parts by mass for the sum 100 parts by mass of the ethylene vinyl acetate copolymer resin and the carbon black. When the content of carbon black is within the range, the resin molded article of the present disclosure exhibits good adhesiveness and good conductivity. On the other hand, when the content of carbon black is less than 15 parts by mass, sufficient conductivity may not be exhibited. Further, when the content of carbon black is greater than 50 parts by mass, the adhesiveness may not be sufficient.

Additive

To adjust various characteristics in the range in which high conductivity can be exhibited, other than the ethylene vinyl acetate copolymer resin and the carbon black that are primary components, various additives less than or equal to 20 parts by mass can be added to the resin molded article of the present disclosure. Various additives may be any agent which are used for a general thermoplastic resin, such as a resin, a filler, a dispersant, an antioxidant, a weathering agent, a stabilizing agent, or the like. More specifically, a lubricant and mold parting agent such as fatty acid amide, fatty acid ester, or metallic salt of fatty acid, an ultraviolet absorbing agent such as a benzotriazole based compound, a benzophenone based compound, a phenyl salicylate compound, or a hindered amine based stabilizer may be used. Further, a phenol based or phosphorous based antioxidant, a tin based thermal stabilizer, a slidability enhancing agent such as polysiloxane, or a coloring agent of various pigments or dyes represented by titanium oxide or the like may be used.

Shape

The shape of the resin molded article of the present disclosure is preferably a sheet shape, and the thickness of the sheet is preferably within a range from 30 μm to 1000 μm. This is because, when the thickness is within the range, the resin molded article can be preferably used for various electronic devices.

Thermal History Characteristic

In general, ethylene vinyl acetate copolymer resin containing carbon black forms a conductive path when carbon black particles dispersed in the ethylene vinyl acetate copolymer resin are contacted with each other and exhibits good conductivity. The resin molded article of the present disclosure has the structure in which a contact portion between carbon black particles is less likely to be cut and thus can exhibit good conductivity even after drawn. Thus, with respect to the resin molded article of the present disclosure, in at least one direction of the resin molded article, the shrinkage factor of the resin molded article at 25 degrees Celsius cooled after heated to 100 degrees Celsius relative to the resin molded article at 25 degrees Celsius before heated, when the resin molded article is heated from 25 degrees Celsius to 100 degrees Celsius and then cooled to 25 degrees Celsius is less than or equal to 2.0%. More preferably, the resin molded article at 25 degrees Celsius obtained when the resin molded article is heated from 25 degrees Celsius to 100 degrees Celsius and then cooled to 25 degrees Celsius expands compared to the resin molded article at 25 degrees Celsius before heated. When a resin molded article has the shrinkage factor of greater than 2.0%, contact between carbon black particles is easily separated when the resin molded article is drawn. As a result, a surface resistivity after drawing is larger than a surface resistivity before drawing (for example, greater than 1.5 times), and the resin molded article may no longer exhibit high conductivity after drawn.

It is considered that this is caused by the following mechanism.

Figure 6:
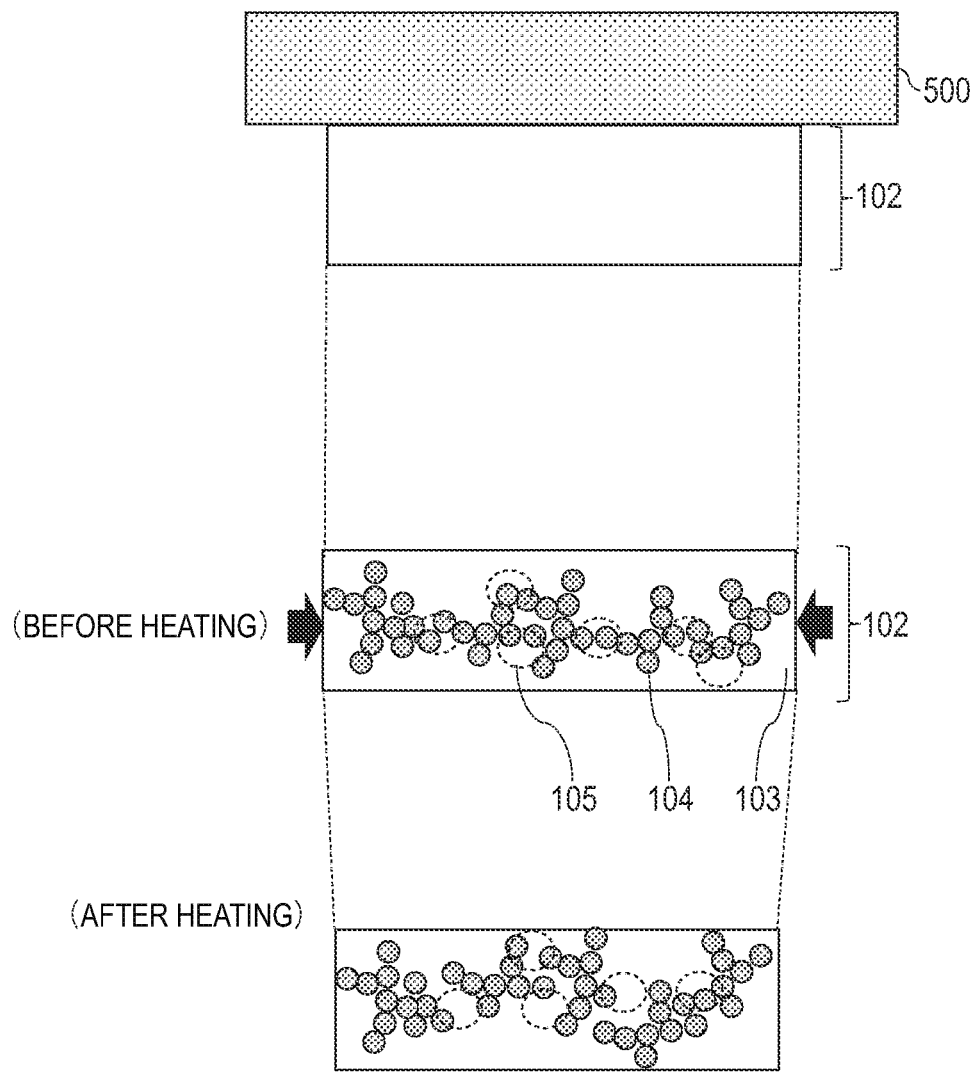
FIG. 6 is a schematic diagram illustrating the structure of a resin molded article of a conventional art.

FIG. 6 is a schematic diagram illustrating the structure of a conventional resin molded article 102. Reference 103 represents an ethylene vinyl acetate copolymer resin, reference 104 represents carbon black particles, and reference 105 represents contact portions between carbon black particles. The conventional resin molded article is caused to shrink in the width direction when a melted and plasticized resin is drawn into a sheet shape from a molding apparatus 500, cooled, and solidified. However, since the resin is cooled and solidified before sufficiently shrinking in the width direction, a compressive stress remains in the width direction (black arrows in FIG. 6). When the stress remaining in the resin molded article is released, the resin molded article shrinks in the direction in which the stress is released, that is, in the width direction. Thus, when the conventional resin molded article is heated from 25 degrees Celsius to 100 degrees Celsius and then cooled to 25 degrees Celsius, the shrinkage factor becomes larger than 2.0%. Further, since the resin molded article is cooled and solidified before sufficiently shrinking in the width direction, carbon black particles contact with each other but not are sufficiently applied with the pressing force. Accordingly, the conventional resin molded article has a disadvantage that, when drawn, the contact of carbon black particles is easily separated, the number of contact portions is reduced, and the conductivity decreases.

FIG. 1 is a schematic diagram illustrating the structure of a resin molded article 2 of the present disclosure. Reference 3 represents an ethylene vinyl acetate copolymer resin, reference 4 represents carbon black particles, and reference 5 represents a contact portion between carbon black particles. A compressive stress in the width direction (white arrows in FIG. 1) is applied to the resin molded article of the present disclosure when a melted and plasticized resin is drawn into a sheet shape from the molding apparatus 50, cooled, and solidified. The resin molded article is then cooled and solidified after sufficiently shrinking in the width direction. Thus, the stress that remains in the resin molded article before heating and causes shrinkage in the width direction (black arrows in FIG. 1) is less than the stress in the conventional resin molded article. Therefore, even when the resin molded article of the present disclosure is heated from 25 degrees Celsius to 100 degrees Celsius and then cooled to 25 degrees Celsius and the stress remaining in the resin molded article is released, the shrinkage amount in the width direction is smaller than that of the conventional resin molded article. Thus, the shrinkage factor is 2.0% or less. Further, expansion may occur without shrinkage. These states are resulted when the cooling and solidification have been performed after sufficient shrinkage in the width direction, which corresponds to a state where force by which the carbon black particles are pressed to each other is sufficiently applied. It is therefore considered that, in the resin molded article of the present disclosure, the contact between carbon black particles is less likely to break even when the resin molded article is drawn, and thus high conductivity can be exhibited.

Electrical Characteristic

The surface resistivity of the resin molded article of the present disclosure is preferably less than or equal to 1320 Ω/square. When the resistivity is less than or equal to 1320 n/square, a resin molded article is preferably used as a conductive member. More preferably, the surface resistivity is less than or equal to 1000 Ω/square.

Values R1 and R2 satisfy a relationship of $R2/R1 \leq 1.5$, where R2 denotes the surface resistivity of the primary face after a primary face of the resin molded article at 25 degrees Celsius is drawn by 40% in one direction, and R1 denotes the surface resistivity of the primary face before drawing. It can be said that, when R2/R1 satisfies the above relationship, reduction of conductivity due to drawing can be suppressed. A preferable relationship between R1 and R2 is $R2/R1 \leq 1.2$, more preferably, $R2/R1 \leq 1.0$.

Manufacturing Method of Resin Molded Article

The manufacturing method of the resin molded article of the present disclosure will be described below.

Kneading Process

First, resin composition in which an ethylene vinyl acetate copolymer resin and carbon black are mixed is melted and kneaded. A method of melting and kneading the resin composition is not particularly limited and a method of melting a resin composition and adding shearing to the resin composition by using a screw or a blade such as a biaxial extrusion apparatus or a kneader may be used, for example. Further, a method of passing a resin composition on a plurality of neighboring rolls as a roll mill and thereby melting and adding shearing may be used. Further, to obtain the resin composition to which shearing has been applied, there is a method of finely cutting a strand that is continuously discharged and pelletizing them and a method of taking out the resin composition as a resin mass and supplying the resin mass to a mill to make them finely pulverized.

Molding Process

Next, after the resin composition is melted and plasticized so that the sheet shrinks in the width direction, the melted resin composition is solidified and cooled to obtain a sheet-shaped resin molded article while applying a compressive stress in a direction orthogonal to the drawing direction (the width direction of the sheet).

The resin molded article of the present disclosure is solidified at a state where shrinkage has progressed in the width direction compared to the conventional resin molded article by solidifying the resin molded article while applying a compression stress in the width direction of a sheet. As a result, the stress that causes shrinkage in the width direction remaining in the resin molded article of the present disclosure is smaller than that in the conventional resin molded article. That is, the shrinkage factor of the resin molded article heated to a high temperature and then cooled is smaller than that of the resin molded article before heated. Specifically, in the resin molded article of the present disclosure, the shrinkage factor of the resin molded article at 25 degrees Celsius cooled after heated to 100 degrees Celsius relative to the resin molded article at 25 degrees Celsius before heated, when the resin molded article is heated from 25 degrees Celsius to 100 degrees Celsius and then cooled to 25 degrees Celsius can be less than or equal to 2.0%. As a result, it is possible to provide the resin molded article that can exhibit high conductivity even after drawn.

A method for solidifying a resin molded article to reduce the residual stress in the width direction may be an extrusion molding method of melting and plasticizing a resin molded article by using a screw, discharging the plasticized resin from a cap spread in the shape of a sheet, and drawing the discharged resin by using a roll, for example. Further, there is an inflation molding method of discharging a plasticized resin from a cylindrical cap, blowing up the resin into a cylindrical shape by air, and continuously drawing a cylindrical sheet. Among these methods, extrusion molding is particularly preferable because rapid shrinkage can be performed in the width direction by rapid cooling.

Figure 2:
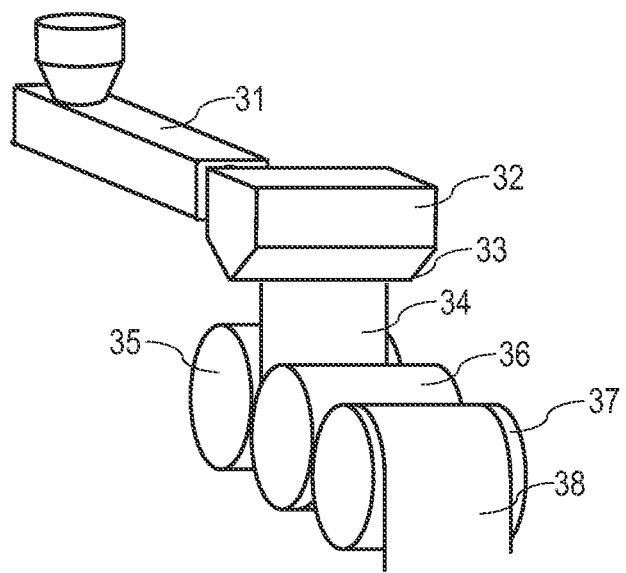
FIG. 2 is a schematic diagram illustrating a sheet extrusion apparatus that can be used for a manufacturing method of the resin molded article of the present disclosure.

FIG. 2 is a schematic diagram illustrating a sheet extrusion apparatus that can be used for a molding process in the manufacturing method of the resin molded article of the present disclosure. The description of the molding process will be continued by using the schematic diagram.

First, the resin composition obtained from the kneading process is supplied into an extrusion apparatus 31. The resin composition is heated at a temperature that is higher than the melting point and melted, plasticized, and transferred to dies 32 by using a heater and a screw. The melted resin composition transferred to the dies 32 is discharged in a sheet shape from the die slip 33. The melted sheet-shaped resin molded article 34 discharged from the die slip 33 is interposed between a first cooling roll 35 and a second cooling roll 36 that are adjusted to a temperature that is lower than or equal to the melting point of the resin, thereby the resin molded article is cooled below the melting point at the same time as being drawn, and the resin molded article is solidified into sheet shape. The resin molded article 38 after solidified is transported by a transport roller 37. When discharged from the dies 32, the discharged sheet-shaped resin molded article 34 is applied with force in the direction of shrinkage, that is, the direction in which the width decreases due to a so-called neck-in phenomenon. When solidified by a cooling roll before the shrinkage sufficiently progresses, this results in the conventional sheet in which a large amount of residual stress causing shrinkage in the width direction remains. On the other hand, when a compressive stress is applied in the width direction of the sheet and solidification is made by a cooling roll in a state where the shrinkage has sufficiently progressed, this can provide the resin molded article of the present disclosure in which a residual stress causing shrinkage in the width direction is small. Note that the magnitude of the residual stress can be controlled in accordance with the extrusion amount of the resin composition, the drawing rate, the distance between the first cooling roll 35 and the second cooling roll 36 by which the resin composition is solidified from the die slip 33 that is a discharge outlet of the resin composition, or the temperature of the dies 32, the first cooling roll 35 and the second cooling roll 36.

Resin Member

Figure 3:
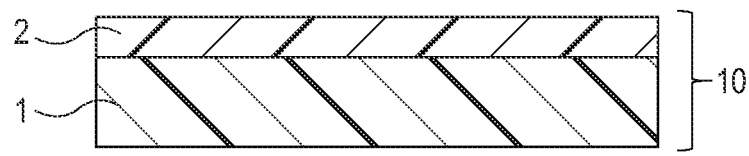
FIG. 3 is a schematic diagram illustrating an embodiment of a resin member of the present disclosure.

FIG. 3 is a schematic diagram illustrating an embodiment of a resin member of the present disclosure. A resin member 10 of the present disclosure has a base material 1 composed of a resin molded article and a resin molded article 2 of the present disclosure on the base material. Note that a resin molded article may be further provided on the resin molded article 2.

Here, while a thickness t1 of the base material 1 and a thickness t2 of the resin molded article 2 are not particularly limited, the thickness t1 of the base material is within a range from 300 μm to 1000 μm, for example. Further, the thickness t2 of the resin molded article 2 is within a range from 30 μm to 1000 μm, for example. When the thickness of the base material 1 and the thickness of the resin molded article 2 are within the ranges, a sufficient strength as a resin molded article 10 is obtained. Further, a ratio t1/t2 of the thicknesses is greater than or equal to 1.5 and less than or equal to 20, for example. When the ratio of the thickness of the base material 1 and the thickness of the resin molded article 2 is within the range, a stress applied to the resin molded article 2 that occurs due to the difference in the linear expansion coefficient between the base material 1 and the resin molded article 2 can be reduced.

A resin of a resin molded article of the base material 1 is not particularly limited, and a polystyrene based resin, a polyethylene based resin, a polypropylene resin, an ABS resin, a polycarbonate resin, a polyacetal resin, or a polyethylene terephthalate resin may be used, for example. Further, a polyphenylene sulfide resin, a polyamide resin, or a polyimide resin may be used. In terms of obtaining an ethylene acetic acid copolymer resin that is likely to be fused and less likely to be peeled, a resin of the base material 1 is preferably a polystyrene based resin. Here, the polystyrene based resin is a resin having the structure illustrated in structural formula 2.

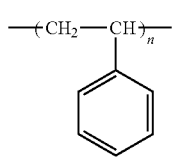

Formula 2

The raw material of the polystyrene based resin is not particularly limited and, for example, a general-purpose polystyrene resin (GPS resin) or a high impact resistance polystyrene resin (HIPS resin) may be used. A commercial product and a mixture of the commercial products can be used for a polystyrene based resin. For example, a commercially available polystyrene based resin may be Toyo Styrene series (TOYO STYRENE Co., Ltd.) or PSJ-POLYSTYRENE series (PS Japan Corporation). In terms of a superior impact resistance, a HIPS resin is preferable.

In general, a HIPS resin is generally obtained by polymerizing or dispersing a rubber-like elastic body in polystyrene in order to improve the impact resistance of the polystyrene resin. The type of the rubber-like elastic body is not particularly limited, and a butadiene rubber, a styrene butadiene rubber, an acrylic rubber, an acrylonitrile butadiene rubber, or a natural rubber may be used, for example. For example, a commercially available material may be NORYL™ series (SABIC Corporation) or DIC styrene HIPS series (DIC Corporation).

Note that a manufacturing method (molding method) of the base material 1 is not particularly limited, and extrusion molding, injection molding, press molding, or inflation molding can be used, for example.

Manufacturing Method of Resin Member

While a manufacturing method of the resin member of the present disclosure is not limited to a particular method with respect to both a kneading process and a molding process, a manufacturing method of the resin member 10 by insert molding will be described below.

First, the resin molded article 2 is manufactured by the manufacturing method described above.

Next, the resin molded article 2 is set in a mold. Next, a resin that is the raw material of the base material 1 is injected while being melted into the mold, and insert molding is performed thereon to obtain the resin member 10 of the present disclosure. Note that, while a molding condition in an insert molding of the resin member is not particularly limited, it is preferable to employ the structure in which a polymer chain of the ethylene vinyl acetate copolymer resin of the resin molded article 2 and a polymer chain of the resin that is a raw material of the base material 1 intermediate with each other in order to obtain high adhesiveness. Thus, before both the resins are adhered, it is preferable that at least one surface of both the resins is melted by heat.

Cartridge

The resin molded article of the present disclosure can be used in a conductive portion in which a metal member has been conventionally used. Specifically, a metal plate used for a cartridge can be replaced with the resin molded article of the present disclosure. Preferably, the resin molded article of the present disclosure can be used for a capacitance detection unit of a cartridge.

Figure 4:
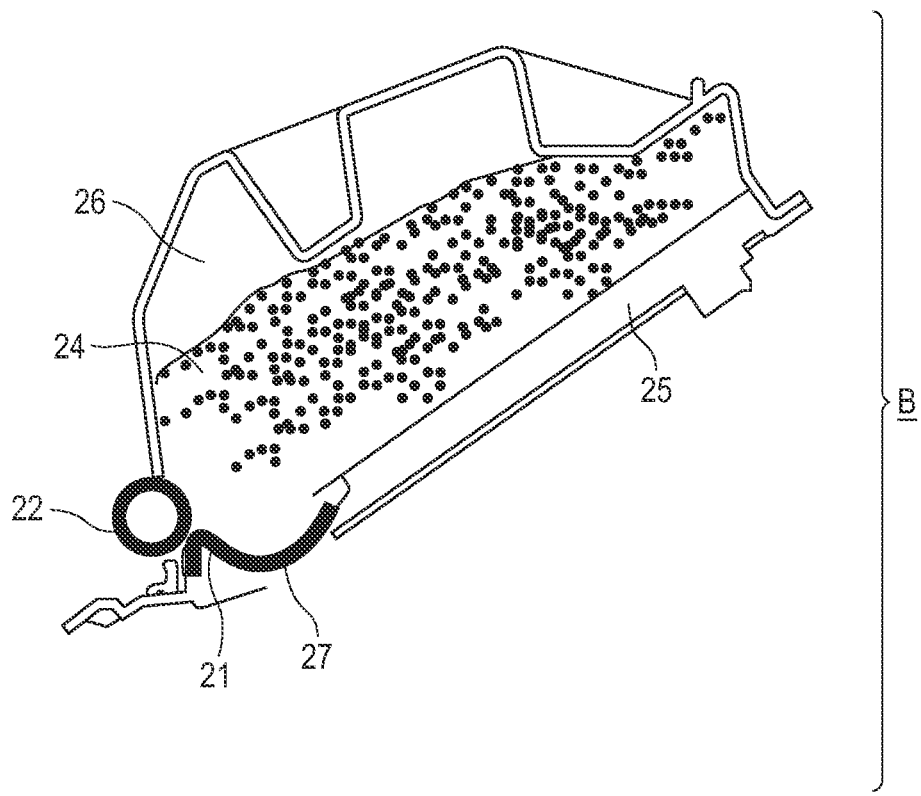
FIG. 4 is a schematic sectional view illustrating an embodiment of a cartridge of the present disclosure.

A cartridge of the present disclosure will be described by using a schematic sectional view illustrated in FIG. 4.

A capacitance detection unit 21 is formed of the resin molded article of the present disclosure and molded integrally with a frame member 25. The material of the frame member 25 is a resin, for example. While a usable resin is not particularly limited, the resin is a polystyrene based resin, for example. Further, the capacitance detection unit 21 has a contact portion 27 electrically connected to the capacitance detection unit. The contact portion 27 is provided so as to be electrically connected to an external device. A developer storage unit 26 stores a developer and is fixed with the frame member 25 by means of welding or the like. In this example, a toner 24 is used as a developer. Further, a cartridge B has a developing roller 22. Since the resin molded article of the present disclosure has high conductivity, the capacitance between the capacitance detection unit 21 made of the resin molded article and the developing roller 22 can be accurately detected. Thus, the change of the capacitance in accordance with a change of the amount of the toner 24 present inside the developer storage unit 26 can be accurately detected.

Image Forming Apparatus

Figure 5:
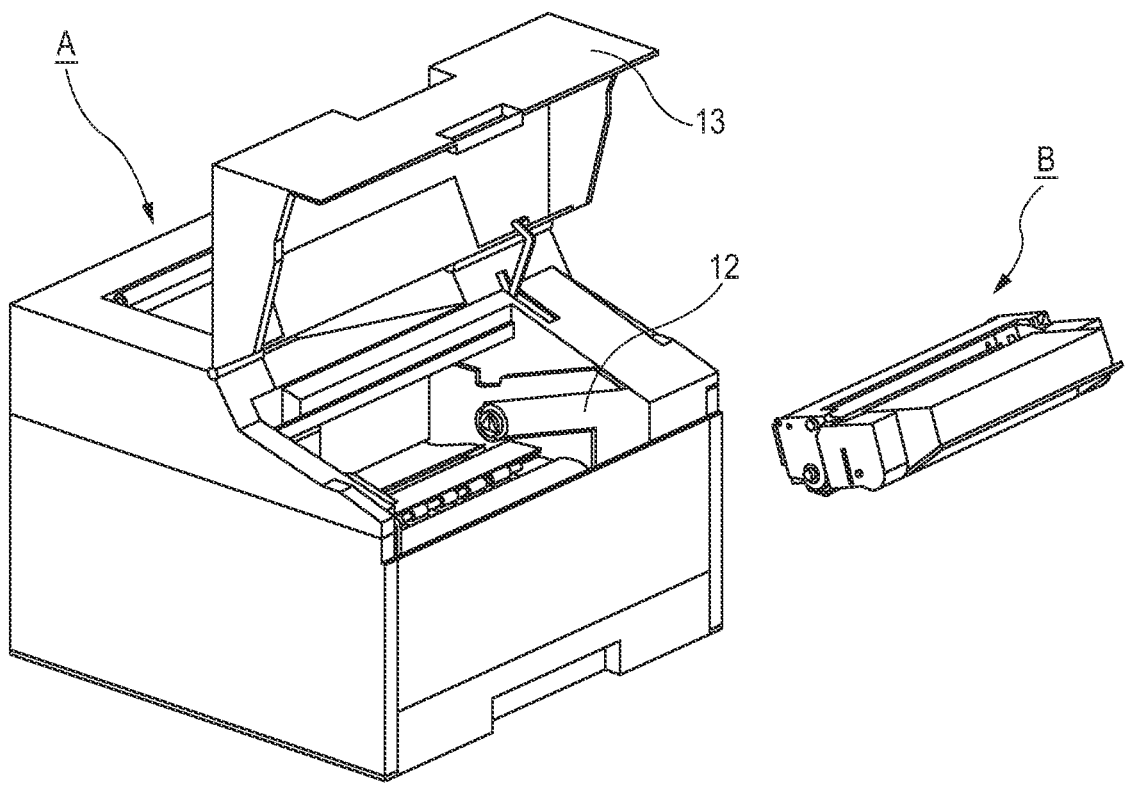
FIG. 5 is a schematic diagram illustrating an embodiment of an image forming apparatus of the present disclosure.

FIG. 5 is a schematic diagram illustrating an embodiment of an image forming apparatus of the present disclosure. An image forming apparatus A has a closure door 13 used for attaching and detaching the cartridge B. FIG. 5 illustrates a state where the closure door 13 is opened. When the cartridge B is attached to the image forming apparatus A along a guide rail 12, a developer residual level detection unit (not illustrated) inside the image forming apparatus A and the contact portion 27 of the cartridge B are electrically connected to each other. With such a configuration, the image forming apparatus A of the present disclosure can accurately detect the amount of the remaining toner 24 in the cartridge B and indicate the amount thereof.

EXAMPLES

Evaluation Method

A measurement method of the resin molded article of the present disclosure will be described below.

Method of Measuring DBP Oil Absorption of Carbon Black

The DBP oil absorption of carbon black was measured by a measurement method compliant with JIS Z 8901 by using an absorption tester (S-500, ASAHI SOUKEN).

Method of Mearing Surface Resistivity

The surface resistivity was measured by the following method.

Loresta-GP MCP-T610 (compliant with JIS-K7194, Mitsubishi Chemical Analytech Co., Ltd.) as a resistance meter and a series four probes (ASP) as an electrode were used as a measurement device. The surface resistivity before drawing was measured at five points for every 100 mm of the center portion in the width direction for a sample sheet of 120 mm in the width direction and 30 mm in the length direction, and the average value thereof was determined as measurement data. Here, a plate of the width x the length is a primary face. Note that the applied voltage was 10 V.

Further, with respect to the surface resistivity after drawing, a tension tester 5582 (Instron Co.) is used for the sample sheet of 120 mm in the width direction and 30 mm in the length direction, and a portion of 10 mm at both ends in the width direction is chuck, so that the distance between the chucks was 100 mm. The chucked sample was drawn at a rate of 1 mm/minute until the distance between chucks became 140 mm. In this state, the surface resistivity of the center portion in the width direction was measured for the sample sheet that has been left for 10 minutes. This measurement was repeated for five times, and the average value thereof was determined as measurement data. Note that the applied voltage was 10 V.

Further, a measurement environment was at 25±3 degrees Celsius and at 55±5% relative humidity.

A sample whose surface resistivity after drawing relative to the surface resistivity before drawing was 1.0 times or less is denoted as A, a sample whose surface resistivity after drawing relative to the surface resistivity before drawing was greater than 1.0 times and less than or equal to 1.2 times is denoted as B, a sample whose surface resistivity after drawing relative to the surface resistivity before drawing was greater than 1.2 times and less than or equal to 1.5 times is denoted as C, and a sample whose surface resistivity after drawing relative to the surface resistivity before drawing was greater than 1.5 times is denoted as D. The samples with evaluation of A, B and C were passed as good samples in determination that reduction in conductivity was suppressed even after drawing, and the sample with evaluation of D was rejected.

Method of Measuring Shrinkage Factor

The shrinkage factor was measured by determining a change of the distance between the chucks as a change of the dimension of the sample in the following measurement conditions by using a thermomechanical analysis device TMA/SDTA 841 (Mettler Toledo International Inc.).

Sample width: 5 mm

Distance between the chucks: 10 mm

Measurement mode: tension

Load: 0.01 N

Temperature Profile (1) holding 25 degrees Celsius for 10 minutes (2) heating from 25 degrees Celsius to 100 degrees Celsius at 5 degrees Celsius/minute (3) holding 100 degrees Celsius for 10 minutes (4) cooling from 100 degrees Celsius to 25 degrees Celsius at 5 degrees Celsius/minute (5) holding 25 degrees Celsius for 10 minutes A shrinkage factor E (unit: %) is calculated by the following equation, where the distance between the chucks at the end of (5) is x5, and the distance between the chucks at the end of (1) is x1.

$$E = \frac{(x1 - x5)}{x1} \times 100$$

Note that, when expansion occurs, a value of shrinkage factor is denoted as a negative value.

Method of Measuring Thickness

The thickness of the resin molded article was measured at 50 points for every 100 mm in the center portion of the sheet in the width direction, and the average value thereof was determined as the measurement data.

Example 1

Fabrication of Resin Composition

Evaflex EV450 (A-1) (Du Pont-Mitsui Polychemicals Co., Ltd.) was used as an ethylene vinyl acetate copolymer resin. SEAST G-FY (B-1) (Tokai Carbon Co., Ltd.) (DBP oil absorption: 152 ml/100 g) was used as carbon black.

These were composed so that a ratio of combination was 55 parts by mass (A-1) and 45 parts by mass (B-1) and stirred by using a tumbler for 10 minutes to obtain a mixture. The obtained mixture was kneaded by using a kneader (Ikegai Corp., biaxial kneader PCM-30) to obtain a resin composition in a pellet form. The kneading conditions are listed below.

Amount of extrusion: 4.0 kg/h

Barrel temperature: 170 degrees Celsius

Dies temperature: 170 degrees Celsius
Number of rotations of screw: 250 rpm
Fabrication of Resin Molded Article The obtained resin composition was extruded and molded by using a sheet extrusion apparatus in which a coat hanger die with a width of 600 mm was connected to a single screw extruder (Research Laboratory of Plastics Technology Co., Ltd., GT-40), and the resin molded article of Example 1 that is a sheet whose thickness is 100 μm was obtained. The extrusion conditions are listed below.

Amount of extrusion: 5.0 kg/h
Dies temperature: 190 degrees Celsius
Roller temperature: 60 degrees Celsius
Drawing rate: 6.4 m/min
Distance between die slip and roller: 200 mm
Evaluation of Resin Molded Article The surface resistivity of the obtained resin molded article was measured. The resistivity was 610 Ω/square, and good conductivity was obtained. Further, the surface resistivity after drawing was measured. The resistivity was 480 Ω/square. The value was 0.79 times the value before drawing, and the resin molded article had also good conductivity after drawing.

Next, the shrinkage factor was measured. The shrinkage factor was −0.28%.

Examples 2 to 17

In Examples 2 to 9, the resin molded article was obtained by the same method as that in Example 1 except that the drawing rate and the distance between the die slip and the roller were changed as illustrated in Table 1.

In Examples 10 to 13, the resin molded article was obtained by the same method as that in Example 1 except that the type of carbon black, the content of carbon black, the dies temperature, and the drawing rate were changed as illustrated in Table 1.

In Example 14 to 17, the resin molded article was obtained by the same method as that in Example 1 except that the roller temperature, the drawing rate, and the distance between the die slip and the roller were changed as illustrated in Table 1.

TABLE 1

| | CB row material | | | Sheet-making conditions | | | |
|---|---|---|---|---|---|---|---|
| | Type | DBP oil absorption (ml/100 g) | Content (weight %) | Dies temperature (° C.) | Roller temperature (° C.) | Drawing rate (m/min) | Distance between die slip and roller (mm) |
| Example 1 | B-1 | 152 | 45 | 190 | 60 | 6.4 | 200 |
| Example 2 | B-1 | 152 | 45 | 190 | 60 | 6.6 | 160 |
| Example 3 | B-1 | 152 | 45 | 190 | 60 | 6.9 | 140 |
| Example 4 | B-1 | 152 | 45 | 190 | 60 | 7.3 | 120 |
| Example 5 | B-1 | 152 | 45 | 190 | 60 | 7.6 | 100 |
| Example 6 | B-1 | 152 | 45 | 190 | 60 | 7.8 | 90 |
| Example 7 | B-1 | 152 | 45 | 190 | 60 | 8.8 | 80 |
| Example 8 | B-1 | 152 | 45 | 190 | 60 | 9.2 | 70 |
| Example 9 | B-1 | 152 | 45 | 190 | 60 | 9.4 | 60 |
| Example 10 | B-2 | 360 | 18 | 210 | 60 | 6.5 | 200 |
| Example 11 | B-3 | 495 | 15 | 210 | 60 | 6.5 | 200 |
| Example 12 | B-4 | 115 | 48 | 170 | 60 | 6.4 | 200 |
| Example 13 | B-5 | 101 | 50 | 170 | 60 | 6.4 | 200 |
| Example 14 | B-1 | 152 | 45 | 190 | 60 | 13.1 | 200 |
| Example 15 | B-1 | 152 | 45 | 190 | 60 | 19.2 | 200 |
| Example 16 | B-1 | 152 | 45 | 190 | 25 | 0.63 | 50 |
| Example 17 | B-1 | 152 | 45 | 190 | 25 | 0.23 | 35 |

The evaluation results of each example are summarized in Table 2. Note that the raw material of the ethylene vinyl acetate copolymer resin and the carbon black used in each example are listed below.

(A) Ethylene vinyl acetate copolymer resin (EVA raw material)
A-1: Evaflex EV450 (Du Pont-Mitsui Polychemicals Co., Ltd.)

(B) Carbon black (CB raw material)
B1: SEAST G-FY (Tokai Carbon Co., Ltd.) (DBP oil absorption: 152 ml/100 g)
B2: Ketjen black (Lion Specialty Chemicals Co., Ltd.) (DBP oil absorption: 360 ml/100 g)
B3: Ketjen black (Lion Specialty Chemicals Co., Ltd.) (DBP oil absorption: 495 ml/100 g)
B4: SEAST SO (Tokai Carbon Co., Ltd.) (DBP oil absorption: 115 ml/100 g)
B5: SEAST N (Tokai Carbon Co., Ltd.) (DBP oil absorption: 101 ml/100 g)

TABLE 2

|  | Thickness (μm) | Shrinkage factor (%) | Surface resistivity R1 before drawing (Ω/square) | Surface resistivity R2 after drawing (Ω/square) | Resistance change rate R2/R1 (times) | Evaluation |
|---|---|---|---|---|---|---|
| Example 1 | 100 | −0.28 | 610 | 480 | 0.79 | A |
| Example 2 | 100 | −0.21 | 630 | 560 | 0.89 | A |
| Example 3 | 100 | −0.18 | 670 | 650 | 0.97 | A |
| Example 4 | 100 | −0.10 | 690 | 750 | 1.09 | B |
| Example 5 | 100 | −0.02 | 710 | 820 | 1.15 | B |
| Example 6 | 100 | 0.05 | 730 | 860 | 1.18 | B |
| Example 7 | 100 | 0.23 | 750 | 880 | 1.17 | B |
| Example 8 | 100 | 1.05 | 770 | 920 | 1.19 | B |
| Example 9 | 100 | 2.00 | 780 | 980 | 1.26 | C |
| Example 10 | 100 | −0.24 | 680 | 720 | 1.06 | B |
| Example 11 | 100 | −0.22 | 620 | 850 | 1.37 | C |
| Example 12 | 100 | −0.19 | 890 | 1150 | 1.29 | C |
| Example 13 | 100 | −0.14 | 960 | 1320 | 1.38 | C |
| Example 14 | 54 | 0.02 | 680 | 660 | 0.97 | A |
| Example 15 | 32 | 1.83 | 720 | 980 | 1.36 | C |
| Example 16 | 510 | 0.54 | 550 | 490 | 0.89 | A |
| Example 17 | 980 | 1.66 | 480 | 630 | 1.31 | C |

The shrinkage factors of Examples 1 to 17 were less than or equal to 2.00%, and the resistivity change ratios denoted as R2/R1 were also less than or equal to 1.5 times.

While the compositions of the resin molded articles of Examples 1 to 9 were the same, reduction of the conductivity after drawing was suppressed in all the Examples. Further, the longer the distance between the die slip and the roller was, the smaller the shrinkage factor was. This is because, for longer time until the resin discharged from the die slip was cooled and solidified by the roller, the resin sheet more sufficiently shrunk in the width direction. Thus, the longer the distance between the die slip and the roller was, the smaller the value of the surface resistivity after drawing was.

Further, in all of Examples 10 to 13 in which a carbon black content was mainly changed, reduction of the conductivity was suppressed even after drawing.

Further, in all of Examples 14 to 17 in which a sheet-making condition was changed, reduction of the conductivity was suppressed even after drawing.

Comparative Example 1

Fabrication of Resin Composition

Evaflex EV450 (A-1) (Du Pont-Mitsui Polychemicals Co., Ltd.) was used as an ethylene vinyl acetate copolymer resin. SEAST G-FY (B-1) (Tokai Carbon Co., Ltd.) (DBP oil absorption: 152 ml/100 g) was used as carbon black.

These were composed so that a ratio of combination was 55 parts by mass (A-1) and 45 parts by mass (B-1) and stirred by using a tumbler for 10 minutes to obtain a mixture. The obtained mixture was kneaded by using a kneader (Ikegai Corp., biaxial kneader PCM-30) to obtain a resin composition in a pellet form. The kneading conditions are listed below.

Amount of extrusion: 4.0 kg/h
Barrel temperature: 170 degrees Celsius
Dies temperature: 170 degrees Celsius
Number of rotations of screw: 250 rpm Fabrication of Resin Molded Article The obtained resin composition was extruded and molded by using a sheet extrusion apparatus in which a coat hanger die with a width of 600 mm was connected to a single screw extruder (Research Laboratory of Plastics Technology Co., Ltd., GT-40) and the resin molded article of Comparative Example 1 that is a sheet whose thickness is 100 μm was obtained. The extrusion conditions are listed below.

Amount of extrusion: 5.0 kg/h
Dies temperature: 190 degrees Celsius
Roller temperature: 60 degrees Celsius
Drawing rate: 9.5 m/min
Distance between die slip and roller: 35 mm Evaluation of Resin Molded Article The surface resistivity of the obtained resin molded article was measured. The resistivity was 820 Ω/square, and the high conductivity was obtained. However, when the surface resistivity after drawing was measured, the resistivity was 1300 n/square. The value was 1.59 times the value before drawing, and the conductivity significantly decreased after drawing.

Next, the shrinkage factor of the resin molded article of Comparative Example 1 was measured. The shrinkage factor was 2.54%. It is considered that this is because the distance between the die slip and the roller was 30 mm, which was shorter than that in Examples 1 to 9, so that the discharged resin was cooled and solidified before the resin sufficiently shrinks, and a large stress in the shrinking direction remains in the resin sheet.

Comparative Examples 2 to 6

In Comparative Example 2, the resin molded article was obtained by the same method as that in Example 13 except that the content of carbon black was changed to 52 parts by mass and the distance between the die slip and the roller was changed to 100 mm In Comparative Example 3, the resin molded article was obtained by the same method as that in Example 13 except that carbon black was changed to SEAST V (Tokai Carbon Co., Ltd.) (DBP oil absorption: 87 ml/100 g) and the content of carbon black was changed to 55 parts by mass.

In Comparative Example 4, the resin molded article was obtained by the same method as that in Example 11 except that the content of carbon black was changed to 12 parts by mass and the distance between the die slip and the roller was changed to 100 mm In Comparative Example 5, the resin molded article was obtained by the same method as that in Example 15 except that the drawing rate was changed to 21.3 m/min.

In Comparative Example 6, the resin molded article was obtained by the same method as that in Example 17 except that the drawing rate was changed to 0.16 m/min.

TABLE 3

|  | CB row material | | Sheet-making conditions | | | |
|---|---|---|---|---|---|---|
|  | Type | DBP oil absorption (ml/100 g) | Content (weight %) | Dies temperature (° C.) | Roller temperature (° C.) | Drawing rate (m/min) | Distance between die slip and roller (mm) |
| Comparative Example 1 | B-1 | 152 | 45 | 190 | 60 | 9.5 | 35 |
| Comparative Example 2 | B-5 | 101 | 52 | 170 | 60 | 7.6 | 100 |
| Comparative Example 3 | B-6 | 87 | 55 | 180 | 60 | 7.6 | 100 |
| Comparative Example 4 | B-3 | 495 | 12 | 190 | 60 | 9.2 | 70 |
| Comparative Example 5 | B-1 | 152 | 45 | 190 | 60 | 21.3 | 200 |
| Comparative Example 6 | B-1 | 152 | 45 | 190 | 25 | 0.16 | 35 |

TABLE 4

|  | Thickness (μm) | Shrinkage factor (%) | Surface resistivity R1 before drawing (Ω/square) | Surface resistivity R2 after drawing (Ω/square) | Resistance change rate R2/R1 (times) | Evaluation |
|---|---|---|---|---|---|---|
| Comparative Example 1 | 100 | 2.54 | 820 | 1300 | 1.59 | D |
| Comparative Example 2 | 100 | 2.63 | 980 | 1520 | 1.55 | D |
| Comparative Example 3 | 100 | 2.58 | 1380 | 2430 | 1.76 | D |
| Comparative Example 4 | 100 | 2.68 | 1670 | 3420 | 2.05 | D |
| Comparative Example 5 | 25 | 2.76 | 1030 | 2160 | 2.10 | D |
| Comparative Example 6 | 1150 | 2.12 | 640 | 990 | 1.55 | D |

The evaluation results of the resin molded article of Comparative Examples 1 to 6 are summarized in Table 4.

All the shrinkage factors of Comparative Examples 1 to 6 were greater than 2.00%, and the resistivity change ratios denoted as R2/R1 were also greater than 1.5 times. That is, the conductivity decreased after drawing.

According to the present disclosure, a resin molded article including an ethylene vinyl acetate copolymer resin and carbon black as primary components that can maintain high conductivity even when the resin molded article is drawn can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A resin molded article comprising an ethylene vinyl acetate copolymer resin and a carbon black,
    wherein 80 parts by mass or more of the ethylene vinyl acetate copolymer resin and the carbon black are contained in 100 parts by mass of the resin molded article,
    wherein R1 and R2 satisfy a relationship of R2/R1≤1.5, where the R2 denotes a surface resistivity of the resin molded article after being drawn by a tension tester and the R1 denotes a surface resistivity of the resin molded article before being drawn by the tension tester, so that, at 25 degrees Celsius, a length of a primary face of the resin molded article in a width direction becomes 140% of a length of the primary face of the resin molded article in the width direction before being drawn by the tension tester, and
    wherein the primary face is a face that intersects a thickness direction of the resin molded article.

2. The resin molded article according to claim 1, wherein the resin molded article at 25 degrees Celsius cooled after heated to 100 degrees Celsius when the resin molded article is heated from 25 degrees Celsius to 100 degrees Celsius and then cooled to 25 degrees Celsius expands compared to the resin molded article at 25 degrees Celsius before heated.

3. The resin molded article according to claim 1, wherein a content of the carbon black is greater than or equal to 15 parts by mass and less than or equal to 50 parts by mass relative to a sum 100 parts by mass of the ethylene vinyl acetate copolymer resin and the carbon black.

4. The resin molded article according to claim 1, wherein a dibutyl phthalate (DBP) oil absorption of the carbon black is greater than or equal to 100 ml/100 g and less than or equal to 500 ml/100 g.

5. The resin molded article according to claim 1, wherein a thickness of the resin molded article is greater than or equal to 30 μm and less than or equal to 1000 μm.

6. A resin member comprising a base material and a resin molded article provided on the base material, wherein the resin molded article is the resin molded article according to claim 1.

7. The resin member according to claim 6, wherein the base material is a polystyrene based resin.

8. A cartridge comprising a frame member, a capacitance detection unit provided with the frame member, and a contact portion electrically connected to the capacitance detection unit,
   wherein the capacitance detection unit comprises the resin molded article according to claim 1.

9. An image forming apparatus comprising a developer residual level detection unit,
   wherein the developer residual level detection unit and the contact portion of the cartridge according to claim 8 are electrically connected to each other.

10. A manufacturing method of a cartridge comprising a frame member, a capacitance detection unit formed on the frame member, and a contact portion electrically connected to the capacitance detection unit, wherein the capacitance detection unit comprises the resin molded article according to claim 1, the manufacturing method comprising:
   preparing the frame member; and
   forming the capacitance detection unit on the frame member.

11. The resin molded article according to claim 1, wherein the resin molded article is sheet shape.

12. The resin molded article according to claim 1, wherein a shrinkage factor of the resin molded article at 25 degrees Celsius cooled after heated to 100 degrees Celsius relative to the resin molded article at 25 degrees Celsius before heated, when the resin molded article is heated from 25 degrees Celsius to 100 degrees Celsius and then cooled to 25 degrees Celsius is less than or equal to 2.0%.

13. A manufacturing method of a resin molded article, the manufacturing method comprising steps of:
   mixing an ethylene vinyl acetate copolymer resin and a carbon black to obtain a resin composition;
   melting the resin composition inside a mold and drawing the resin composition from the mold while applying a compressive stress to the resin composition; and
   solidifying the drawn resin composition to obtain a resin molded article comprising the ethylene vinyl acetate copolymer resin and the carbon black,
   wherein 80 parts by mass or more of the ethylene vinyl acetate copolymer resin and the carbon black are contained in 100 parts by mass of the resin molded article,
   wherein R1 and R2 satisfy a relationship of R2/R1≤1.5, where the R2 denotes a surface resistivity of the resin molded article after being drawn by a tension tester and the R1 denotes a surface resistivity of the resin molded article before drawn by the tension tester, so that, at 25 degrees Celsius, a length of a primary face of the resin molded article in a width direction becomes 140% of a length of the primary face of the resin molded article in the width direction before being drawn by the tension tester, and
   wherein the primary face is a face that intersects a thickness direction of the resin molded article.

14. The manufacturing method of a resin molded article according to claim 13, wherein a shrinkage factor of the resin molded article at 25 degrees Celsius cooled after heated to 100 degrees Celsius relative to the resin molded article at 25 degrees Celsius before heated, when the resin molded article is heated from 25 degrees Celsius to 100 degrees Celsius and then cooled to 25 degrees Celsius is less than or equal to 2.0%.

15. The manufacturing method of a resin molded article according to 13, wherein the resin molded article at 25 degrees Celsius cooled after heated to 100 degrees Celsius when the resin molded article is heated from 25 degrees Celsius to 100 degrees Celsius and then cooled to 25 degrees Celsius expands compared to the resin molded article at 25 degrees Celsius before heated.

* * * * *